April 17, 1945.  R. J. BROWN  2,373,944
MILLING MACHINE ATTACHMENT
Filed Jan. 24, 1944
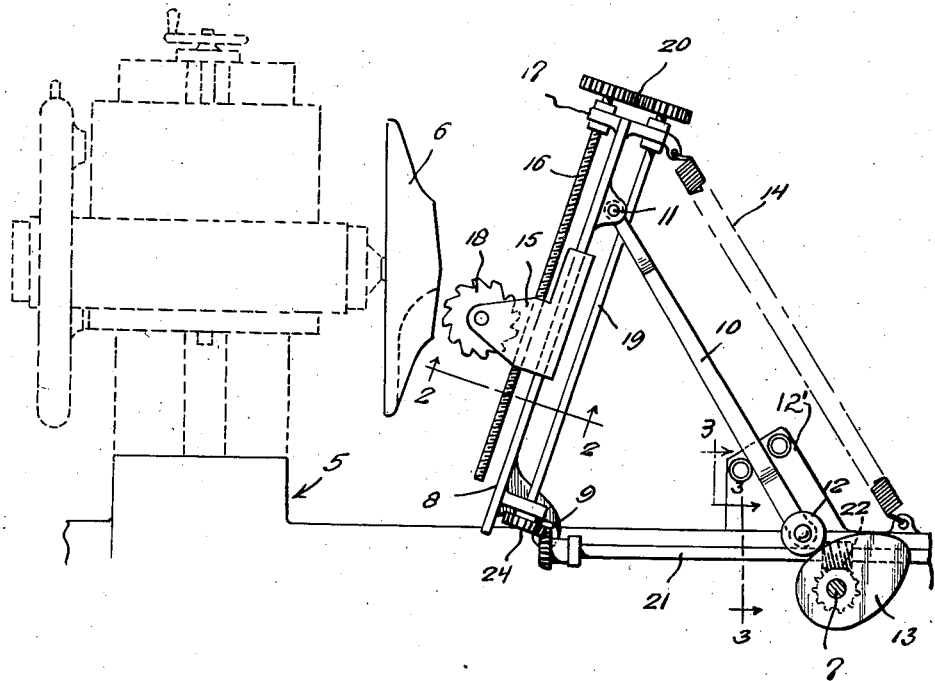
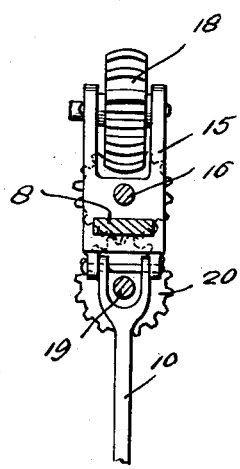
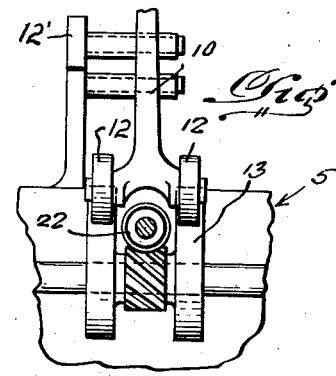
Inventor
Robert J. Brown,
Attorneys

UNITED STATES PATENT OFFICE 2,373,944

MILLING MACHINE ATTACHMENT

Robert J. Brown, Lyons, Ill.

Application January 24, 1944, Serial No. 519,491

1 Claim. (Cl. 90—13.5)

This invention relates to an attachment for gear milling machines, and has for the primary object the provision of an attachment especially adapted for milling or making determined cuts in stock for the manufacture of impellers used in superchargers for engines and other devices.

Another object of this invention is the provision of an attachment for the milling machine which includes a power driven cutter and a support therefor which when in operation will present the cutter against the work or stock for cutting action thereon and cause the cutter to make an arcuately curved cut for the first part of the cutting stroke and a substantially straight cut for the remainder of said stroke and to return the cutter to its starting position after the completion of the cutting stroke.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a side elevation illustrating a portion of a milling machine equipped with an attachment in accordance with my invention.

Figure 2 is a sectional view taken on the line 2—2 of Figure 1.

Figure 3 is a sectional view taken on the line 3—3 of Figure 1.

Referring in detail to the drawing, the numeral 5 indicates a fragmentary portion of a gear milling machine to which the present invention is adapted, the milling machine being employed for the support of the stock 6 to be cut. Milling machines of this character are equipped with a reversible power shaft indicated by the character 7. This shaft on one cycle of operation of the milling machine rotates in one direction and on the next cycle of operation of the milling machine rotates in a reverse direction. These features are merely stated to give a clear conception of the present invention which is in the form of an attachment easily installed on a milling machine, as shown in Figure 1.

The attachment includes an elongated support 8 pivoted on the milling machine opposite the work, as at 9, and has connected adjacent the other end a pitman 10. A pivotal connection is provided between the member 8 and the pitman, as shown at 11. The other end of the pitman 10 has journaled thereon rollers 12 which ride upon matched cams 13 secured on the shaft 7. A coil spring 14 connected to the member 8 maintains the rollers 12 in riding contact with the cams 13 at all times. A suitable guide 12' is provided for the pitman 10 to prevent the rollers 12 from moving off the cam.

Slidable on the member 8 is a carriage 15 including a threaded portion meshing with the threads of a feed shaft 16 paralleling the member 8 and journaled thereto, as shown at 17. The carriage 15 rotatably supports a power driven cutter 18. The power source for the cutter 18 is not shown, however, an electric motor may be connected directly to the shaft of the cutter and supported by the carriage 15.

A shaft 19 paralleling the member 8 and feed shaft 16 is journaled on the member 8 and geared to the feed shaft, as shown at 20. A shaft 21 in journaled on the milling machine and is geared to the shaft by a worm and worm gear designated by the character 22. Gears 24 connect the shafts 19 and 21. The gears 24 are shaped so that the member 8 carrying the carriage 15 may swing on the pivot 9 while the shafts 19 and 21 remain coupled together at all times.

The feed shaft 16 reciprocates the carriage 15 on the member 8 during the swinging movement of the carriage toward and from the work. This causes the cutter 18 to travel on a cutting stroke and a reverse stroke. On the cutting stroke of the cutter, the member 8 under the influence of the cams is caused to travel or swing toward the work 6 and as the carriage slides in one direction on the member 8 during said movement thereof toward the work, the cutter 18 is caused to make an arcuate shaped cut on the first part of its cutting stroke and then cut in a substantially straight path on the remainder of its cutting stroke, forming a cut in the face of the work 6 as indicated by dotted lines in Figure 1, thus shaping the front face of the work to resemble the front face of an impeller including the hub portion and blades.

It is to be understood that in forming the various blades as specified several of such cuts must be made in the front face of the stock. Said cuts may be made either before or after the stock has been severed from its periphery toward its hub in forming the individual blades. As the cutter 18 completes its cutting stroke the carriage is then caused to travel in a reverse direction on the member 8 and the latter to swing away from the work 6, repositioning the cutter at the beginning of another cutting stroke.

It will be seen that the reciprocation of the carriage and the swinging of the member 8 is brought about through the reverse rotation of the cams 13 by the shaft 7 of the milling machine. Further, it is to be understood that after each cut made in the work 6 by the cuttter 18, the work is rotated to bring another portion of the face of the work in position to be acted on by the cutter 18. It will, therefore, be seen from the foregoing description, taken in connection with the accompanying drawing, that a very efficient attachment has been provided for a milling machine whereby stock may have one face thereof cut in such a manner that will form said face of the work to have the appearance of an impeller, the entire operation of the attachment being automatic requiring only the changing of the position of the work with respect to the cutter after each cutting stroke. However, on some milling machines even the changing of the position of the work with respect to the cutter of the attachment can be automatically carried out after each cutting stroke of the cutter.

While I have shown and described the preferred embodiment of my invention, it will be understood that minor changes in construction, combination and arrangement of parts may be made without departing from the spirit and scope of the invention as claimed.

Having thus described the invention, what I claim is:

In combination with a milling machine including means for the support of stock and a reversible drive shaft, a support mounted on the machine for swinging movement toward and from the work, a carriage slidable on the support and including a power driven cutter, a feed shaft connected to the carriage and journaled on the support for the reciprocation of the carriage on the support, a drive means connecting the feed shaft to the drive shaft, a pitman pivoted to the support, a cam on the drive shaft, a roller on the pitman engaging the cam, and tension means acting on the support to maintain the roller in riding contact with the cam.

ROBERT J. BROWN.